(12) United States Patent
Kennedy et al.

(10) Patent No.: US 12,497,492 B2
(45) Date of Patent: Dec. 16, 2025

(54) STRUCTURED DENSE FLUOROPOLYMER FILMS AND METHODS OF MAKING SAME

(71) Applicant: W. L. Gore & Associates, Inc., Newark, DE (US)

(72) Inventors: Michael E. Kennedy, Oxford, PA (US); Shaofeng Ran, Kennet Square, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 96 days.

(21) Appl. No.: 18/605,514

(22) Filed: Mar. 14, 2024

(65) Prior Publication Data

US 2024/0218136 A1 Jul. 4, 2024

Related U.S. Application Data

(62) Division of application No. 17/277,776, filed as application No. PCT/US2018/054559 on Oct. 5, 2018, now Pat. No. 12,031,001.

(51) Int. Cl.
*C08J 5/18* (2006.01)
*B32B 3/28* (2006.01)
(Continued)

(52) U.S. Cl.
CPC ............... *C08J 5/18* (2013.01); *B32B 3/28* (2013.01); *B32B 27/08* (2013.01); *B32B 27/322* (2013.01);
(Continued)

(58) Field of Classification Search
CPC ........... C08J 5/18; C08J 2327/18; B32B 3/28; B32B 27/08; B32B 27/322; B32B 37/182;
(Continued)

(56) References Cited

U.S. PATENT DOCUMENTS

| | | | |
|---|---|---|---|
| 3,953,566 A | 4/1976 | Gore | |
| 5,183,545 A | 2/1993 | Branca et al. | |

(Continued)

FOREIGN PATENT DOCUMENTS

| | | |
|---|---|---|
| CN | 1961030 A | 5/2007 |
| CN | 105658418 A | 6/2016 |

(Continued)

OTHER PUBLICATIONS

International Preliminary Report on Patentability received for PCT Patent Application No. PCT/US2018/054559, mailed on Apr. 15, 2021, 12 pages.

(Continued)

*Primary Examiner* — Travis M Figg

(57) ABSTRACT

A structured fluoropolymer film including a plurality of structures having a height at least two times a thickness of a corresponding unstructured fluoropolymer film and at least a 20% increase in displacement induction period when compared to the corresponding unstructured fluoropolymer film when measured in a biaxial tensile curve at a temperature of about 125° C. In addition, the structured fluoropolymer film has a methane permeability of less than 500 $\mu g * \mu m/cm^2/min$. The structured fluoropolymer film exhibits a higher resistance to strain and retain barrier properties during manufacture and/or use.

11 Claims, 7 Drawing Sheets

(51) Int. Cl.
  *B32B 27/08* (2006.01)
  *B32B 27/32* (2006.01)
  *B32B 37/18* (2006.01)
  *B32B 38/00* (2006.01)
  *C08L 27/18* (2006.01)

(52) U.S. Cl.
  CPC ........ *B32B 37/182* (2013.01); *B32B 38/0012* (2013.01); *C08L 27/18* (2013.01); *B32B 2307/518* (2013.01); *B32B 2307/7246* (2013.01); *C08J 2327/18* (2013.01)

(58) Field of Classification Search
  CPC .......... B32B 38/0012; B32B 2307/518; B32B 2307/7246; C08L 27/18
  See application file for complete search history.

(56) References Cited

U.S. PATENT DOCUMENTS

| | | |
|---|---|---|
| 5,476,589 A | 12/1995 | Bacino |
| 5,708,044 A | 1/1998 | Branca |
| 5,853,855 A | 12/1998 | Nemoto et al. |
| 6,541,589 B1 | 4/2003 | Baillie |
| 7,306,729 B2 | 12/2007 | Bacino et al. |
| 7,521,010 B2 | 4/2009 | Kennedy et al. |
| 7,531,611 B2 | 5/2009 | Sabol et al. |
| 8,637,144 B2 | 1/2014 | Ford |
| 9,139,669 B2 | 9/2015 | Xu et al. |
| 9,644,054 B2 | 5/2017 | Ford et al. |
| 9,650,479 B2 | 5/2017 | Ford et al. |
| 2004/0182463 A1 | 9/2004 | Bessette et al. |
| 2005/0238872 A1 | 10/2005 | Kennedy et al. |
| 2008/0061472 A1 | 3/2008 | Kennedy et al. |
| 2011/0167547 A1 | 7/2011 | Jain |
| 2012/0282437 A1 | 11/2012 | Clark et al. |
| 2013/0260111 A1 | 10/2013 | Kelsey et al. |
| 2015/0111031 A1 | 4/2015 | Ford et al. |
| 2015/0321822 A1* | 11/2015 | Moritz ............ B65D 7/12 428/35.9 |
| 2016/0167291 A1 | 6/2016 | Zagl et al. |
| 2017/0292053 A1 | 10/2017 | Zaggl et al. |
| 2017/0313132 A1* | 11/2017 | Kresge ............ B32B 27/30 |
| 2018/0333946 A1 | 11/2018 | Zaggl et al. |
| 2021/0347955 A1 | 11/2021 | Kennedy et al. |

FOREIGN PATENT DOCUMENTS

| | | | |
|---|---|---|---|
| EP | 0758570 A1 | 2/1997 | |
| EP | 3061598 A1 | 8/2016 | |
| EP | 3061598 B1 * | 4/2019 | ............ B29D 7/01 |
| JP | 09-054178 A | 2/1997 | |
| JP | 2006-225955 A | 8/2006 | |
| JP | 2007-534523 | 11/2007 | |
| JP | 2016-535693 A | 11/2016 | |
| JP | 2017-531918 A | 10/2017 | |
| JP | 2018-509295 A | 4/2018 | |
| WO | 2005/105434 A2 | 11/2005 | |
| WO | 2015/024662 A1 | 2/2015 | |
| WO | 2016/048335 A1 | 3/2016 | |
| WO | 2016/135188 A1 | 9/2016 | |

OTHER PUBLICATIONS

International Search Report and Written Opinion received for PCT Patent Application No. PCT/US2018/054559, mailed on Jun. 28, 2019, 17 pages.

\* cited by examiner

STRUCTURED DENSE FLUOROPOLYMER FILMS AND METHODS OF MAKING SAME

CROSS-REFERENCE TO RELATED APPLICATION

This application is a divisional of U.S. application Ser. No. 17/277,776, filed Mar. 19, 2021, which is a national phase application of PCT Application No. PCT/US2018/054559, internationally filed on Oct. 5, 2018, which are herein incorporated by reference in their entireties for all purposes.

FIELD

The present disclosure relates generally to structured dense fluoropolymer films and to articles including structured dense fluoropolymer films and associated methods of making such films.

BACKGROUND

Fluoropolymer films are used in various products and devices to provide a barrier against an array of fluids including liquids and gases. Both monolithic and multi-component, multi-layer films have been constructed. However, no suitable fluoropolymer films have been found which provide thermal stability, high strength, thinness, chemical inertness, and retention of barrier properties, such as resistance to water vapor permeation, during manufacture and use of products and devices where deformation happens at relatively low temperatures.

One example of a fluoropolymer film used as a barrier layer is polytetrafluoroethylene (PTFE). PTFE is chemically inert and can withstand harsh chemical environments over a broad range of temperatures. For example, PTFE has exhibited utility as a material for use in harsh chemical environments where other polymers quickly degrade.

In some instances, an expanded polytetrafluoroethylene (ePTFE) can be used in place of PTFE. The node and fibril microstructure of ePTFE leads to a higher strength than PTFE while still retaining the chemical inertness and wide temperature range compatibility of PTFE. However, the porosity of ePTFE may not suitable for use as a barrier layer to low surface tension fluids because fluids with surface tensions less than about 50 dyne-cm can pass through the ePTFE film.

One solution is to use a dense fluoropolymer film, such as densified ePTFE. Dense films are characterized by a high resistance to water vapor (i.e., low water vapor permeation). While dense films have been successfully implemented in many applications requiring thin materials with good chemical resistance and resistance to water vapor permeation, the barrier properties of dense films often decrease or degrade when the film is subject to varying amounts of strain, for example, during manufacture or use of the product or device. Therefore, there is a need for dense fluoropolymer films that exhibit a high resistance to strain and which retain their barrier properties during manufacture and/or use.

SUMMARY

According to one example ("Example 1"), a structured fluoropolymer film includes a dense fluoropolymer film. The dense fluoropolymer film includes a plurality of structures having a height at least two times the thickness of a corresponding unstructured fluoropolymer film. The structured fluoropolymer film also includes at least a 20% increase in a displacement induction period when compared to the corresponding unstructured dense fluoropolymer film when measured in a biaxial tensile curve at a temperature of about 125° C.

According to another example ("Example 2") further to Example 1, the structured fluoropolymer film has a structural density in at least one direction of at least 1/mm.

According to another example ("Example 3") further to Examples 1 or 2, the structured fluoropolymer film has a methane permeability of less than 500 µg*µm/cm$^2$/min.

According to another example ("Example 4") further to any of Examples 1-3, the structured fluoropolymer film has a void volume that is less than 20%.

According to another example ("Example 5") further to any of Examples 1-4, the structured fluoropolymer film has a matrix tensile strength that is greater than or equal to about 7.0 MPa in at least one direction.

According to another example ("Example 6") further to any of Examples 1-5, an increase in the displacement induction period of the structured fluoropolymer film compared to the displacement induction period of the corresponding unstructured fluoropolymer film is at least 20%.

According to another example ("Example 7") further to any of Examples 1-6, the structured fluoropolymer film includes polytetrafluoroethylene (PTFE).

According to another example ("Example 8") further to Example 7, the PTFE is a PTFE homopolymer, a modified PTFE, a tetrafluoroethylene (TFE) copolymer, or combinations thereof.

According to another example ("Example 9") further to any of claims 1-8, the structured fluoropolymer film has at least a 5% increase in mass per unit area when compared to the corresponding unstructured fluoropolymer film.

According to another example ("Example 10"), a composite includes the structured fluoropolymer film of any of Examples 1-9.

According to another example ("Example 11") further to Example 10, the composite includes at least one thermoplastic selected from the group consisting of fluorinated ethylene propylene (FEP), polyvinylidene fluoride (PVDF), perfluoro (alkyl vinyl) ethers (PAVE), perfluoroelastomeric materials, a polymer of tetrafluoroethylene, hexafluoropropylene, vinylidene fluoride (THV), perfluoroalkoxy alkane (PFA), a copolymer of ethylene and tetrafluoroethylene (ETFE) and polychlorotrifluoroethylene (PCTFE).

According to another example ("Example 12"), a laminate includes the structured fluoropolymer film of any of claims 1-9.

According to another example ("Example 13"), a method of making a structured fluoropolymer film includes stretching an elastic substrate, applying a dense fluoropolymer film onto the stretched elastic substrate such that the dense fluoropolymer film reversibly adheres to the elastic substrate, and relaxing the elastic substrate with the dense fluoropolymer film thereon to obtain a structured fluoropolymer film. The structured fluoropolymer film includes a plurality of structures that have a height that is at least two times the thickness of the dense fluoropolymer film from the applying step.

According to another example ("Example 14") further to Example 13, the method also includes adhering the structured fluoropolymer film to a surface of a composite or a laminate.

According to another example ("Example 15") further to Example 13, the structured fluoropolymer film has a matrix tensile strength in at least one direction that is greater than or equal to about 7.0 MPa.

According to another example ("Example 16") further to any of Examples 13 and 14, the structured fluoropolymer film includes PTFE.

According to another example ("Example 17") further to any of Examples 13-15, the dense fluoropolymer film comprises a fluoropolymer selected from a group consisting of polytetrafluoroethylene (PTFE), a modified PTFE, TFE copolymers and combinations thereof.

According to another example ("Example 18") further to any of Examples 13-16, the dense fluoropolymer film has a thickness from about 0.5 µm and 250 µm.

According to another example ("Example 19") further to any of Examples 13-17, the elastic substrate includes a material selected from the group consisting of polysiloxane, fluorosilicone rubber and combinations thereof.

According to another example ("Example 20") further to any of Examples 13-18, the elastic substrate is stretched at a processing ratio from 1.1 to 11 in at least one direction.

According to another example ("Example 21") further to any of Examples 13-19, forming the dense fluoropolymer film includes providing a biaxially expanded PTFE film, densifying the expanded PTFE film to form a densified PTFE film, and stretching the densified PTFE film at a temperature that is greater than the crystalline melt temperature of PTFE to form a dense fluoropolymer film.

According to another example ("Example 22") further to Example 21, the dense fluoropolymer film has a water vapor permeability coefficient of about 0.015 g*mm/m²/day.

According to another example ("Example 23") further to Example 21, the biaxially expanded PTFE film is sintered prior to densifying the expanded PTFE film.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

DETAILED DESCRIPTION

Persons skilled in the art will readily appreciate that various aspects of the present disclosure can be realized by any number of methods and apparatus configured to perform the intended functions. It should also be noted that the accompanying figures referred to herein are not necessarily drawn to scale, but may be exaggerated to illustrate various aspects of the present disclosure, and in that regard, the figures should not be construed as limiting.

The present disclosure relates to structured dense fluoropolymer films having improved strain-to-barrier properties compared to unstructured dense fluoropolymer films. Dense fluoropolymer films are often used as barrier protection in medical devices, protective garments, and other various products and devices such as rubber o-rings. However, dense fluoropolymer films may exhibit a reduction in barrier performance when subjected to relatively small amounts of strain such as, for example, the formation or use of the article. Thus, introducing strain capability into dense fluoropolymer films by pre-structuring the film can improve and/or retain the film's barrier properties when subjected to various amounts of strain. In other terms, this built-in film structure allows for deformation of the film without compromising the barrier performance of the film.

Figure 1:
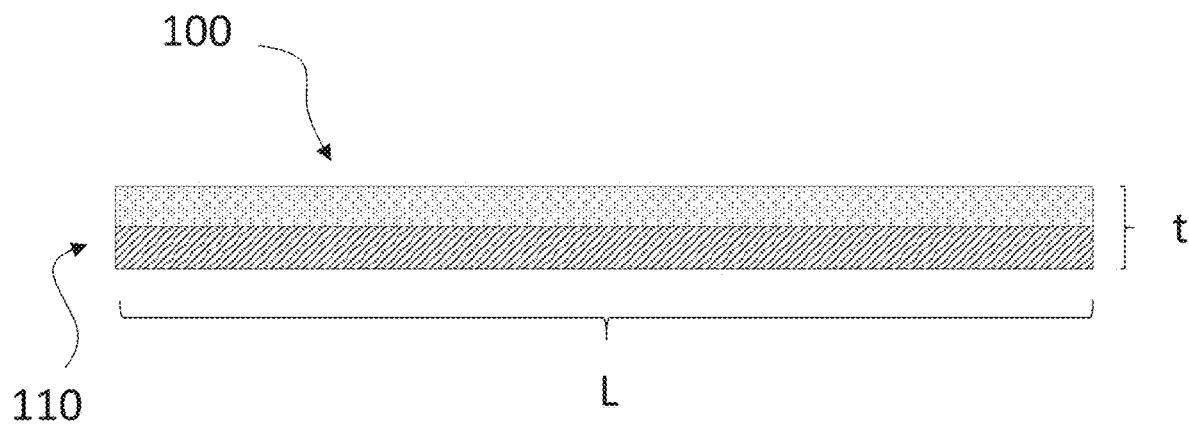
FIG. 1 is a schematic view of an unstructured fluoropolymer film adhered onto a surface of a stretched substrate, in accordance with an embodiment.

FIG. 1 is a schematic view of an unstructured fluoropolymer film 100 on a stretched substrate or article 110, according to an embodiment. As shown, the unstructured fluoropolymer film 100 is substantially flat and generally 2-dimensional and planar (e.g., horizontally planar in FIG. 1). In other terms, unstructured films contain no wrinkles, folds, or other out-of-plane structures within the film. In some embodiments, the unstructured fluoropolymer film 100 is a dense fluoropolymer film.

As used herein, the term "film" generally means any kind of thin fluoropolymer material (i.e., a fluoropolymer material which has an extension in two dimensions that is large compared to the extension in the remaining dimension such as, for example, by a factor of at least 10, at least 100, or more than 100). A thin polymer material such as this is also referred to as a "2-dimensional structure." In the illustrated embodiment of FIG. 1, for example, the film 100 has a relatively large length L (which is measured in a horizontal x-direction in FIG. 1), a relatively large width (not shown) (which is measured in a horizontal y-direction in FIG. 1), and a relatively small thickness t (which is measured in a vertical z-direction in FIG. 1).

The term "dense film" as used herein means a film having a high resistance to water vapor (i.e., low water vapor permeability) and a high matrix tensile strength in both x- and y-directions. As used herein, the term "x-direction" is meant to denote a machine direction or longitudinal direction and the term "y-direction" is meant to denote a transverse direction (e.g., opposite of the longitudinal direction). In some embodiments, a dense film may have, for example, a water vapor permeability coefficient of about 0.015 g-mm/m²/day or less, about 0.010 g-mm/m²/day or less, or about 0.003 g-mm/m²/day or less. In some embodiments, the dense film may have a matrix tensile strength of at least 69 MPa in both the x and y directions, a matrix tensile strength from about 100 MPa to about 200 MPa in at least one direction (for example, a matrix tensile strength of at least 103 MPa in at least one direction, or a matrix tensile strength of at least 172 MPa in at least one direction. In some embodiments, the dense film may have a void volume of less than about 20%.

A method of making such a dense film may involve extruding a suitable fluoropolymer, drying the polymer, compressing (i.e., densifying) the polymer, expanding (i.e., stretching) the polymer before and/or after the compressing step, and sintering the polymer. In one embodiment, the method involves biaxially expanding a PTFE film, densifying the ePTFE film, and stretching the densified ePTFE film at a temperature greater than the crystalline melt temperature of PTFE film. Even after stretching, the dense ePTFE film may have a void volume less than about 20%, less than about 15%, less than about 10%, or less than about 5% to maintain suitable barrier properties. Other suitable methods for forming a dense ePTFE film exist and are known to those skilled in the art.

In some embodiments, the unstructured fluoropolymer film 100 may be adhered to a surface of the stretched substrate 110 (i.e., a suitable article or film that has been stretched by, for example, introducing strain into the article or film). In some instances, the unstructured fluoropolymer film 100 may be adhered to the surface of the stretched substrate 110 at discrete, specific portions of the film. For example, certain portions of the unstructured fluoropolymer film 100 are adhered to the surface of the stretched substrate 110 while other portions of the unstructured fluoropolymer film 100 remain unadhered. Because the unstructured fluoropolymer film 100 is flat, the unstructured fluoropolymer film 100 lies flush with the surface of the stretched substrate 110 onto which portions of the unstructured fluoropolymer film 100 are adhered. As the stretched substrate 110 is allowed to relax and retract, the unadhered portions of the unstructured fluoropolymer film 100 lift off the surface of the stretched substrate 110 and deform, forming wrinkles, folds, and/or other out-of-plane structures to form a structured fluoropolymer film 200 shown in FIG. 2A.

Figure 2A:
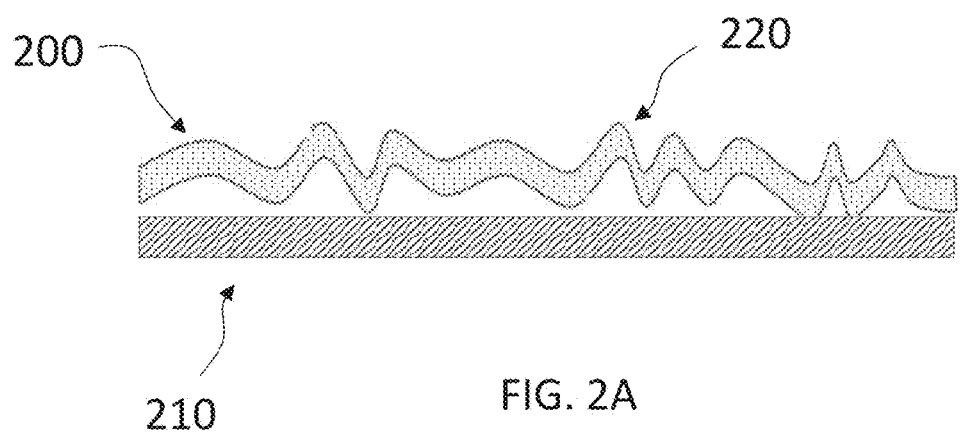
FIG. 2A is a schematic view of a structured fluoropolymer film adhered onto a surface of a relaxed substrate, in accordance with an embodiment.

FIG. 2A is a schematic view of the structured fluoropolymer film 200 on a relaxed (e.g., un-stretched) article 210, according to an embodiment. As shown, the structured film 200 includes a plurality of structures 220. The structures 220 include any kind of geometric, out-of-plane, or 3-dimensional structures such as wrinkles, folds, and/or other such similar structures. The structures 220 may be substantially uniform in size, shape, and/or height, or the structures 220 may be random (i.e., varied in size, shape, and/or height). The structures 220 are generally raised off the surface of the article 210. The structures 220 provide an increased surface area to the structured fluoropolymer film 200 compared to the surface of the unstructured dense film 100 and can stretch and/or unfold when strain is introduced into the article 200. As a result, the structured fluoropolymer film 200 experiences strain without a degradation in barrier performance and the film's barrier properties remain intact.

Generally, the height of each of the structures 220 of the structured fluoropolymer film 200 is related to the amount of strain the film can withstand before its barrier properties are affected. For example, the greater the height of the structures 220, the more strain the film 200 can withstand. Thus, the height of the structures 220 may depend on the desired end use for the structured film 200 and/or the article 210 on which it is adhered. In some embodiments, the structures 220 may have a height (e.g., a vertical height in FIG. 2A) at least two times the thickness of the corresponding unstructured film 100. For example, if an unstructured film 100 has an average thickness of about 5 µm, the structures 220 of the corresponding structured film 200 may have an average height of at least about 10 µm. If the unstructured film 100 has an average thickness of about 1 µm, the structures 220 of the corresponding structured film 200 may have an average height of at least about 2 µm. In other examples, the plurality of structures 220 can have a height that is three times, four times, five times, or more than five times the thickness of the corresponding unstructured film 100.

In some embodiments, the unstructured fluoropolymer film 100 may have a thickness from about 1 µm to about 50 µm, or from about 5 µm to about 25 µm. In some embodiments, the structures 220 may have a height of about 2 µm, about 20 µm, about 200 µm, about 500 µm, or about 1000 µm, or may range from about 2 µm to about 1000 µm depending on the thickness of the unstructured fluoropolymer film 100.

Figure 2B:
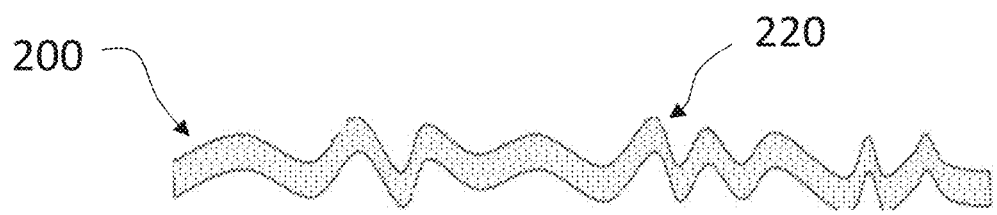
FIG. 2B is a schematic view of a structured fluoropolymer film, in accordance with an embodiment.

FIG. 2B is a schematic view of the structured fluoropolymer film 200, according to an embodiment. As shown, the structured fluoropolymer film 200 retains the structures 220 even after removal from the relaxed article 210 (FIG. 2A).

As discussed herein, any subsample of the structured fluoropolymer film 200 provides increased surface area compared to the unstructured fluoropolymer film 100 due to the structures 220. In some embodiments, the structured fluoropolymer film 200 has an overall area increase factor of at least about 1.8, at least about 3.0, or at least about 5.0 compared to the unstructured fluoropolymer film 100. As used herein, the term "area increase factor" is meant to characterize an increase in total surface area of the structured fluoropolymer film 200 compared to the total surface area of the unstructured fluoropolymer film 100. In other words, the area increase factor is a ratio of the surface area of a sample of the structured fluoropolymer film 200 to the surface area of a sample of the same size and from the same or a corresponding portion of the unstructured fluoropolymer film 100.

In some embodiments, the structured film 200 may also have an increased mass per unit area compared to the unstructured film 100. For example, the structured fluoropolymer film 200 may have a mass per unit area increase of at least about 5%, at least about 10%, or at least about 15% compared to the unstructured fluoropolymer film 100.

In some embodiments, the structured fluoropolymer film 200 may also have a structure density of as little as about 1/mm and as great as about 10/mm in at least one direction (e.g., in either the x-direction or the y-direction) or in both the x-direction and the y-direction. As used herein, the term "structure density" is defined as the number of structures 220 present in a given length of the structured fluoropolymer film 200. In other words, for a given length of the structured fluoropolymer film 200, the structure density is equal to the number of structures 220 divided by the length of the structured fluoropolymer film 200. Like the height of the structures 220, the structure density also affects the amount of strain the structured fluoropolymer film 200 can withstand before its barrier properties are affected. For example, the higher the structure density, generally, the more strain the structured fluoropolymer film 200 can withstand.

In some embodiments, the amount of structure built into the structured fluoropolymer film 200 by the structuring process can be quantified by measuring the displacement induction period of the structured fluoropolymer film 200. As used herein, the phrase "displacement induction period" is a measure of the amount the structured fluoropolymer film 200 can stretch before the load becomes significant. For example, as defined herein, the displacement induction period is the amount of displacement of a ball during a ball burst test before the load reaches about 0.1 lbf (about 0.445 N) at a temperature of 125° C. Generally, the higher the displacement induction period, the greater strain the structured film can withstand before the integrity of the barrier properties is significantly decreased. When testing for displacement induction period, the ball travels at a constant speed and, thus, the displacement induction period can be measured as a displacement distance or a displacement time. An increase in the displacement induction period can be reported as a percent increase in distance or time of the displacement induction period measured for the structured fluoropolymer film 200 relative to the unstructured fluoropolymer film 100. In some embodiments, the structured fluoropolymer film 200 has at least a 20% increase, at least a 100% increase, at least a 200% increase, or at least a 300% increase in displacement induction period compared to the corresponding unstructured fluoropolymer film 100. In addition, the structured fluoropolymer film has a methane permeability of less than 500 µg*µm/cm²/min.

The structured fluoropolymer film 200 can include any material capable of forming a suitable barrier layer to the underlying article 210. In some embodiments, the structured fluoropolymer film 200 may be selected from polytetrafluoroethylene (PTFE), a PTFE homopolymer, modified PTFE, expanded modified PTFE, expanded polytetrafluoroethylene (ePTFE), a tetrafluoroethylene (TFE) copolymer, expanded copolymers of PTFE, such as are described in U.S. Pat. No. 5,708,044 to Branca, U.S. Pat. No. 6,541,589 to Baillie, U.S. Pat. No. 7,531,611 to Sabol et al., U.S. Pat. No. 8,637,144 to Ford, and U.S. Pat. No. 9,139,669 to Xu et al. Expanded polytetrafluoroethylene (ePTFE) membranes prepared in accordance with the methods described in U.S. Pat. No. 7,306,729 to Bacino et al., U.S. Pat. No. 3,953,566 to Gore, U.S. Pat. No. 5,476,589 to Bacino, or U.S. Pat. No. 5,183,545 to Branca et al. may also be used herein. The dense fluoropolymer film may also be prepared in accordance with the methods described in U.S. Pat. No. 7,521,010 to Kennedy et al., U.S. Pat. No. 9,644,054 to Ford et al., U.S. Pat. No. 9,650,479 to Ford et al.

Figure 3:
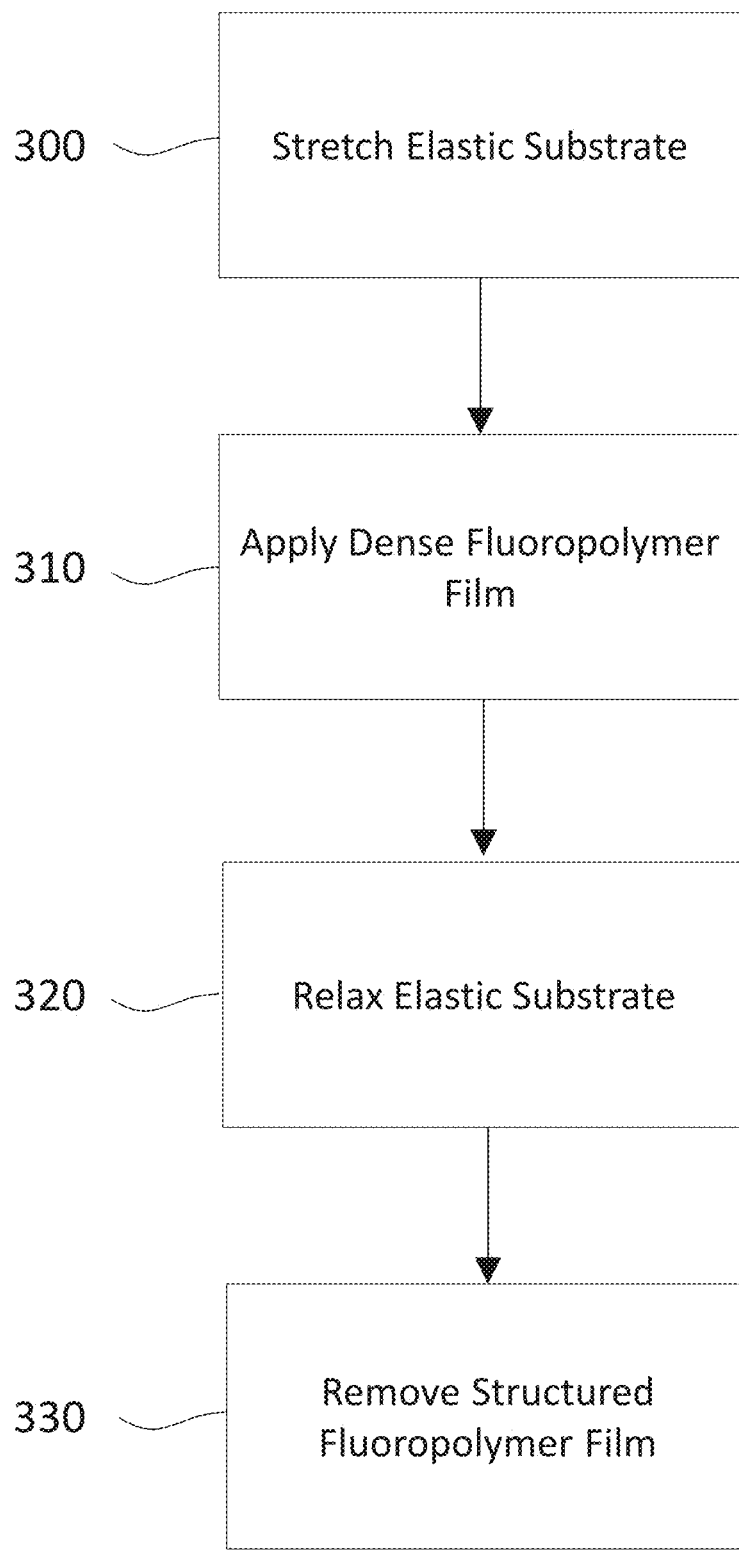
FIG. 3 is a flow diagram of a method of forming a structured fluoropolymer film, in accordance with an embodiment.

FIG. 3 is a flow diagram depicting a method of forming a structured fluoropolymer film 200, in accordance with an embodiment. The method is described herein with respect to FIGS. 1 and 2. The method includes stretching an elastic substrate in a first step 300 (FIG. 1) to form a stretched elastic substrate 110. For example, the substrate 110 may be stretched from an initial, relaxed state to a stretched state. In various embodiments, the stretched substrate 110 may include any elastic material that has a suitable stretchability and provides sufficient adhesion to the applied dense film (e.g., unstructured fluoropolymer film 100). For example, in some embodiments, the stretched substrate 110 may include materials such as polydimethylsiloxane (PDMS), silicon rubber, or other polymeric elastomers.

In some embodiments, the elastic substrate is stretched in at least one direction. For example, the elastic substrate can be stretched uniaxially (e.g., in the machine direction or x-direction or in the transverse or y-direction) or biaxially (e.g., in the machine or x-direction and in the transverse or y-direction direction). The biaxial stretching may be performed simultaneously or subsequently. Simultaneously means that the elastic substrate is stretched at the same time in both the machine and transvers directions. For example, the elastic substrate may be stretched in both the x-direction and y-direction at the same time. Subsequently means that the elastic substrate is first stretched in one direction (e.g., the x-direction) to a desired amount and then in another direction (e.g., the y-direction or in a perpendicular direction to the first direction).

The extent of stretching of the elastic substrate is defined by a processing ratio p which, as used herein, is defined by the following formula (1):

$$\rho = L/L_0 \quad (1)$$

where:

$L$ = the final length or width of the elastic substrate in the stretched state; and $L_o$ = the initial length of the elastic substrate in the non-stretched, relaxed state.

For example, a processing ratio with a p of 2 means that the final length L in the stretched state is two times the initial length $L_o$ in the relaxed state. In some embodiments, the elastic substrate may be stretched by a processing ratio p of 1.1, 1.5, or 2.0 in one direction, or 6.0, 8.5, or 11 in one direction, or may be within a range of from 1.1 to 11, from 1.5 to 8.5, or from 2.0 to 6.0.

After stretching the elastic substrate to form the stretched substrate 110, a dense fluoropolymer film (e.g., the unstructured fluoropolymer film 100) is applied to the stretched substrate 110 in step 310 such that portions of the unstructured fluoropolymer film 100 are adhered to the surface of the stretched substrate 110 while other portions of the unstructured fluoropolymer film 100 are not adhered (FIG. 1). "Adhesion," as used herein, is meant to denote that the unstructured fluoropolymer film 100 is physically attached to the surface of the stretched substrate 110. For example, the unstructured fluoropolymer film 100 may be adhered to the surface of the stretched substrate 110 by way of, for example, van-der-Waals forces, static forces, or other methods capable of producing a non-permanent adhesion such that no permanent bonding occurs between the unstructured fluoropolymer film 100 and the stretched substrate 110. For example, once structured, the structured fluoropolymer film 200 is able to be removed from the relaxed article 210 in a non-destructive manner.

Once the unstructured fluoropolymer film 100 is adhered to the stretched substrate 110, the stretched substrate 110 is then relaxed in step 320 (FIG. 3) to form the relaxed article 210 (FIG. 2A). As the stretched substrate 110 is relaxed, small spaces, gaps, and/or 3-dimensional structures 220 form as sections of the film lift off the surface of the relaxed article 210, thus forming the structured fluoropolymer film 200. For example, portions of the unstructured fluoropolymer film 100 that were not adhered to the stretched substrate 110 may be the sections of the structured fluoropolymer film 200 that lift off the surface of the relaxed article 210 to form the structures 220. In some embodiments, the structuring process may be carried out at room temperature. In other embodiments, the structuring process may be carried out at elevated temperatures. For example, the processing chamber may be heated to a temperature between room temperature (approximately 23° C.±3° C.) and about 220° C., or between about room temperature and about 180° C., and may depend on various factors such as a temperature limit of the processing chamber and/or the thermal stability or melting temperature of the substrate and dense film.

The method also includes removing the structured fluoropolymer film 200 from the relaxed article 210 (FIG. 2B) in step 330 (FIG. 3).

After the formation of the structured fluoropolymer film 200 and removal of the structured fluoropolymer film 200 from the relaxed article 210, the structured fluoropolymer film 200 can be adhered to the surface of a composite material or integrated into a laminate, for example, via a pressure roll to form a structured composite or structured laminate. The structured laminate may include at least one layer of ePTFE, for example. However, the laminate can include any number and/or type of layers as desired. In some embodiments, the structured fluoropolymer film 200 may be a structured composite.

In some embodiments, the structured composite may include a thermoplastic polymer such as fluorinated ethylene propylene (FEP), polyvinylidene fluoride (PVDF), perfluoro (alkyl vinyl) ethers (PAVE), perfluoroelastomeric materials, a polymer of tetrafluoroethylene, hexafluoropropylene, vinylidene fluoride (THV), perfluoroalkoxy alkane (PFA), a copolymer of ethylene and tetrafluoroethylene (ETFE), and/or polychlorotrifluoroethylene (PCTFE). In some instances, the structured composite may be formed into a 3-dimensional article such as, for example, various medical devices (i.e., rubber seals, balloons, and other such devices).

Test Methods

It should be understood that, although certain methods and equipment are described below, other methods or equipment determined suitable by one of ordinary skill in the art may be alternatively utilized.

Tensile Measurements

Tensile properties were measured on an INSTRON® tensile tester (Model 5965, Illinois Tool Works Inc., Glenview, IL) based on the ASTM standard D412F (ASTM International, West Conshohocken, PA).

Bulk Density Measurements

Bulk density was measured by die-cutting films into circular, coupon samples. Film thickness were measured at three different locations on each coupon sample, for example, by using a Mitutoyo Litematic VL-50A contact gauge digital measuring unit (Mitutoyo America Corp., Aurora, IL). Following the thickness measurement, each sample was weighed and the bulk density was calculated by conventional methods known to those of skill in the art.

Skeletal Density Measurements

Skeletal density was measured by a helium pycnometer such as ACCUPYC® 1340 (Micromeritics Instrument Corp., Norcross, GA). Before measuring, the pycnometer was calibrated using a steel ball with a known volume.

Void Volume

Void volume of the film was estimated by calculating the difference between bulk density and skeletal density. The void percent was calculated with the following formula (2):

$$\text{void (\%)} = 100 * \frac{(\rho_{skeleton} - \rho_{bulk})}{\rho_{skeleton}} \quad (2)$$

Methane Permeation

Methane permeation was measured using a methane tester. The methane tester was a diffusion setup having no back pressure in the system. A stainless-steel chamber consisting of two halves was located in the center of the device. The film was sandwiched between the two halves. Methane gas was directed at the film was then flowed from the bottom of the device. Compressed air was flowed through a catalyst bed to eliminate hydrocarbons in the air (e.g., zero air) and then into the top of the chamber as the carrier gas. A flame ionization (FID) detector was located at the top of the device and was used to measure the amount of methane gas permeated through the film.

The methane concentration was then determined by the FID voltage and calibration curve. Methane flux was calculated with the following formula (3):

$$\text{Flux} = CR/A \quad (3)$$

wherein:

$C$ = the concentration in ppm of methane as measured by the *FID*;

$R$ = the flow rate of zero air in mL/min; and $A$ = the area of the chamber in cm².

Areal Strain

Areal strain was measured by die cutting the film into circular, coupon samples. Each sample was weighed. Mass per area (MPA) was then calculated with the following formula (4):

$$MPA = \frac{m}{\pi R^2} \quad (4)$$

Areal strain was then calculated by determining the ratio between the MPA of a structured dense film and the MPA of an unstructured dense film. Areal strain was calculated with the following formula (5):

$$\text{Areal Strain} = \left(\frac{MPA_{after\ structuring}}{MPA_{before\ structuring}} - 1\right) \times 100 \quad (5)$$

Ball Burst Test

Biaxial mechanical properties of a structured dense film was tested on a mechanical property tester or ball burst tester. The film was mounted on a cylindrical cup. A stainless-steel ball was then pushed onto the film by a stainless-steel rod connected to an INSTRON® model 5567 (Illinois Tool Works Inc., Glenview, IL) to determine the biaxial properties of the film.

EXAMPLES

Example 1: Preparation of a Dense Fluoropolymer Film

A PTFE resin was mixed with isoparaffinic hydrocarbon lubricant (ISOPAR® K, Exxon, Houston, TX) at a concentration of 0.184 g/g. The mixture was then blended and compressed into a cylindrical pellet. The pellet was thermally conditioned for a period of about 24 hours at a temperature of 49° C. The pellet was then extruded through a rectangular die at a reduction ratio of 182:1 to form a tape having a thickness of 0.635 mm. The tape was then dried such that remaining lubricant was removed.

After drying, the tape was expanded in a longitudinal direction (e.g., machine direction) at a temperature of 330° C. and a stretch ratio of about 3.4:1. The tape was then expanded in a transverse direction at a temperature of 300° C. and a stretch ratio of about 9.4:1 to form an unsintered ePTFE membrane.

The membrane was then densified in accordance with the methods described in U.S. Pat. No. 9,650,479 B2 to Ford et al. by compressing between rollers or other suitable compression equipment at a temperature and pressure to substantially eliminate the pores.

After compression, the membrane was loaded onto a pantograph machine. The material was then heated to a temperature above the crystalline melting temperature of PTFE (e.g., to a temperature of about 370° C.) for a period of about 10 min. The heated membrane was then stretched at a strain rate of about 10% per second until a ratio of about 1.5:1 in the longitudinal direction and about 3.3:1 in the transverse direction was achieved. The matrix tensile strength (MTS) was measured in both the machine direction and transverse direction. Results are provided in Table 1.

TABLE 1

| Sample | MPA (g/m²) | Thickness (μm) | Longitudinal MTS (MPa) | Transverse MTS (MPa) | Void Volume | Methane Permeation (μm * μg/cm²/min) |
|---|---|---|---|---|---|---|
| 1 | 33.51 | 15 | 207.6 | 246.3 | 0.94% | 0.98 |

Example 2: Preparation of a Structured Fluoropolymer Film

The dense fluoropolymer film of Example 1 was adhered to a stretched elastic substrate in accord with the structuring process described herein. The chamber was heated to a temperature of 180° C. After about five minutes, the stretched elastic substrate was relaxed at a rate of about 5 mm/s, thereby returning it to a preset, less stretched state. Various strain set points (% of maximum elongation of elastomeric substrate) were tested in both the x-axis (i.e., machine direction) and the y-axis (i.e., transverse direction). Relaxing of the stretched elastic substrate caused the adhered film to wrinkle, forming a structured fluoropolymer film. The mass per area (MPA) and areal strain were calculated as previously described. Results are shown in Table 2.

TABLE 2

| Sample | Strain set point x-axis (%) | Strain set point y-axis (%) | MPA (g/m²) | Areal Strain (%) |
|---|---|---|---|---|
| 1 | 25 | 25 | 52.35 | 56.21 |
| 1 | 38 | 38 | 75.10 | 124.1 |
| 1 | 50 | 50 | 103.2 | 207.9 |

Example 3: Preparation of a Dense Fluoropolymer Film

A PTFE resin mixture was prepared and formed into a cylindrical pellet as described in Example 1. The pellet was then extruded through a rectangular die at a reduction ratio of 182:1 to form a tape having a thickness of 0.635 mm. The tape was then dried such that remaining lubricant was removed.

After drying, the tape was expanded in a longitudinal direction between heated drums at a temperature of 330° C. and a stretch ratio of about 3.4:1. The tape was then expanded in the transverse direction at a temperature of 300° C. and a stretch ratio of 9.4:1 to form an unsintered ePTFE membrane.

The membrane was then densified as described in Example 1. After compression, the membrane was loaded onto a pantograph machine. The material was then heated to a temperature of about 370° C. for a period of about 10 min. The heated membrane was then stretched at a strain rate of about 10% per second until a ratio of about 1.8:1 in the longitudinal direction and about 3.9:1 in the transverse direction was achieved. The matrix tensile strength (MTS) was measured in both the machine direction and transverse direction. Results are provided in Table 3.

TABLE 3

| Sample | MPA (g/m²) | Thickness (μm) | Longitudinal MTS (MPa) | Transverse MTS (MPa) | Void Volume | Methane permeation (μm * μg/cm²/min) |
|---|---|---|---|---|---|---|
| 2 | 22.58 | 10 | 242.8 | 277.06 | 0.29% | 0.26 |

Example 4: Preparation of a Structured Fluoropolymer Film

The dense fluoropolymer film of Example 3 was adhered to a stretched elastic substrate in accord with the structuring process described herein. The chamber was heated to a temperature of 180° C. After about five minutes, the stretched elastic substrate was relaxed at a rate of about 5 mm/s, thereby returning it to a preset, less stretched state. Various strain set points (% of maximum elongation of elastomeric substrate) were tested in both the x-axis (i.e., machine direction) and the y-axis (i.e., transverse direction). Relaxing of the stretched elastic substrate caused the adhered film to wrinkle, forming a structured fluoropolymer film. The mass per area (MPA) and areal strain were calculated as previously described. Results are shown in Table 4.

TABLE 4

| Sample | Strain set point x-axis (%) | Strain set point y-axis (%) | MPA (g/m²) | Areal Strain (%) |
|---|---|---|---|---|
| 2 | 25 | 25 | 28.57 | 26.52 |
| 2 | 38 | 38 | 49.10 | 117.5 |
| 2 | 50 | 50 | 76.16 | 237.3 |

The maximum height of the structures was also measured and compared to the amount of strain and/or stretch in the stretched elastic substrate. The results for Example 4 show that, generally, less strain and/or stretch in the substrate results in shorter structures. For example, when the areal strain was 26.5%, the maximum height of the structures ranged from about 250 μm to about 450 μm. However, when the areal strain was 117.5%, the maximum height of the structures ranged from about 350 μm to about 900 μm.

Example 5: Preparation of a Dense Fluoropolymer Film

A PTFE resin mixture was prepared and formed into a cylindrical pellet as described in Example 1. The pellet was then extruded through a rectangular die at a reduction ratio of 182:1 to form a tape having a thickness of 0.635 mm. The tape was then dried such that remaining lubricant was removed.

After drying, the tape was expanded in a longitudinal direction between heated drums at a temperature of 320° C. and a stretch ratio of about 6.4:1. The tape was then expanded in the transverse direction at a temperature of 330° C. and a stretch ratio of 6.1:1 to form an unsintered ePTFE membrane.

The membrane was then densified as described in Example 1. After compression, the membrane was loaded onto a pantograph machine. The material was then heated to a temperature of about 370° C. for a period of about 10 min. The heated membrane was then stretched at a strain rate of about 10% per second until a ratio of about 1.5:1 in the longitudinal direction and about 3.8:1 in the transverse direction was achieved. The matrix tensile strength (MTS) was measured in both the machine direction and transverse direction. Results are provided in Table 5.

TABLE 5

| Sample | MPA (g/m²) | Thickness (μm) | Longitudinal MTS (MPa) | Transverse MTS (MPa) | Void Volume | Methane Permeation (μm * μg/cm²/min) |
|---|---|---|---|---|---|---|
| 3 | 13.09 | 5 | 271.7 | 271.5 | 1.25% | 0.78 |

Example 6: Preparation of Structured Fluoropolymer Film

Figure 4:
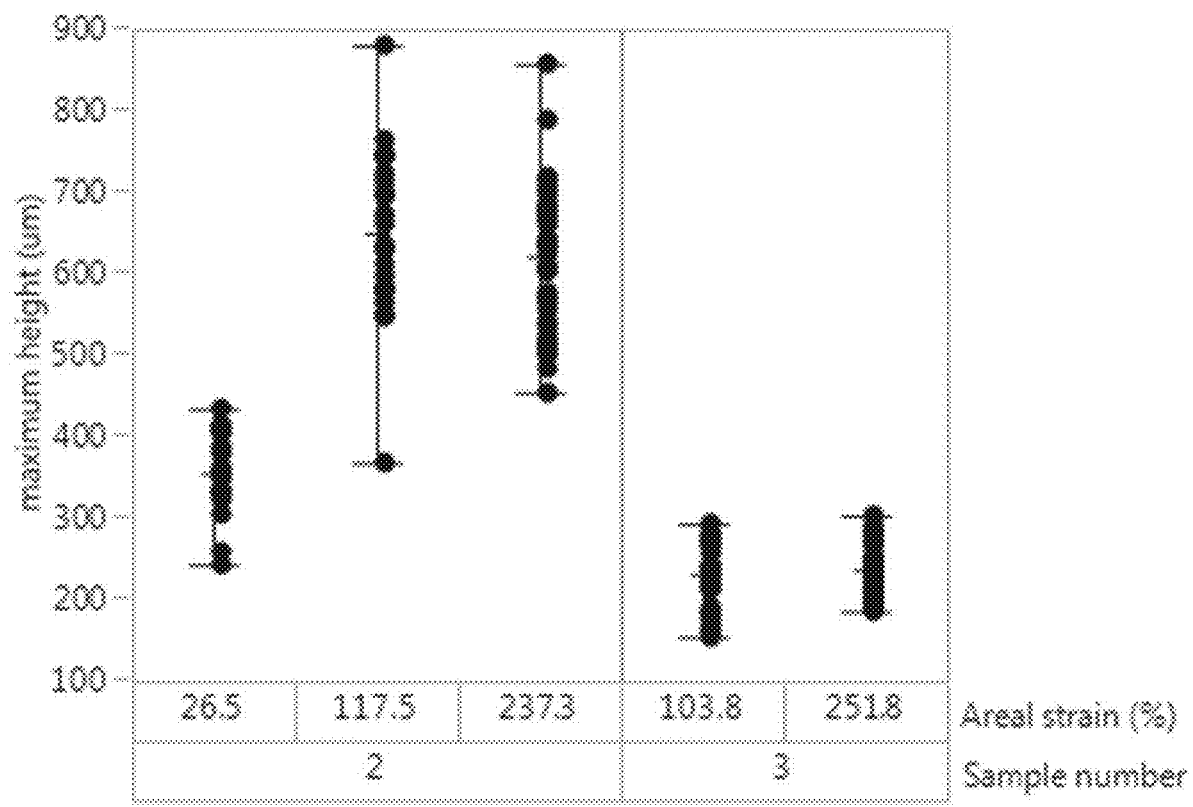
FIG. 4 is a graph showing maximum heights of the structures of the structured fluoropolymer film, in accordance with an embodiment.
Figure 5:
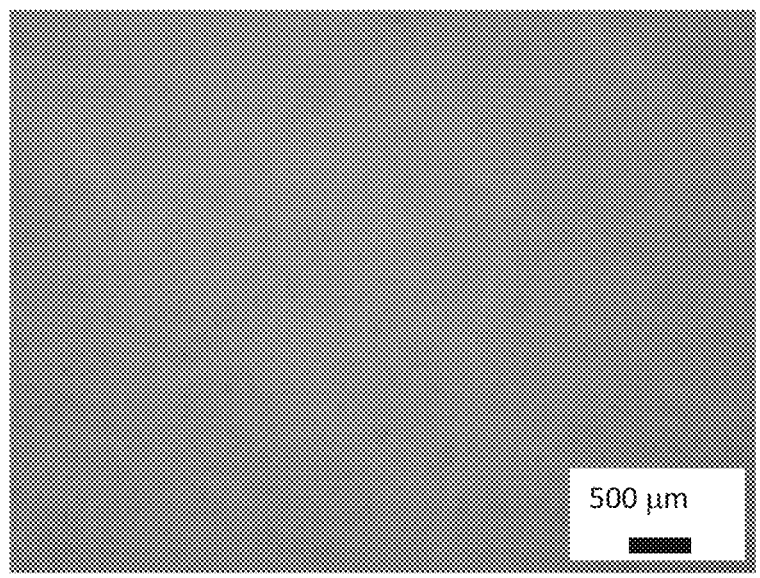
FIG. 5 is an optical micrograph image of an unstructured fluoropolymer film, in accordance with an embodiment.
Figure 6:
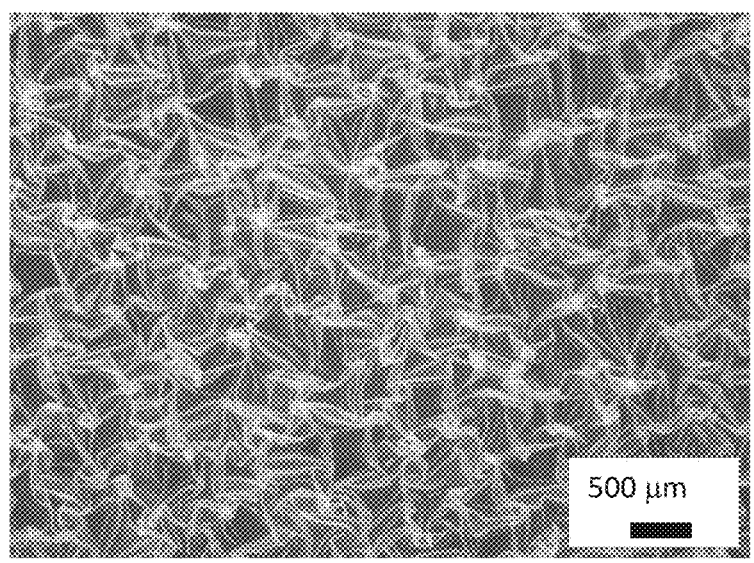
FIG. 6 is an optical micrograph image of a structured fluoropolymer film, in accordance with an embodiment.
Figure 7:
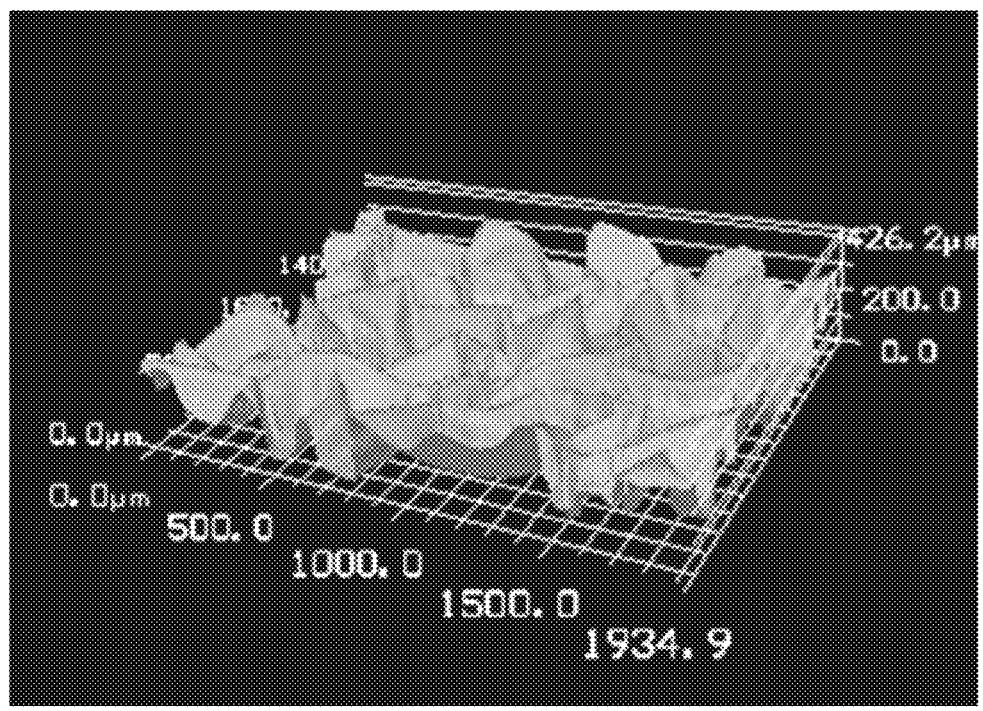
FIG. 7 is a micrograph image of the structured fluoropolymer film of FIG. 6, in accordance with an embodiment.

The structured fluoropolymer films were formed from the dense fluoropolymer film of Example 5 according to the process described in Example 2. Results are shown in Table 6. The maximum height of the structures was also measured and compared to the amount of strain and/or stretch in the stretched elastic substrate and is shown in FIG. 4. FIG. 5 shows an optical micrograph image of the unstructured, dense fluoropolymer film, as described above in Example 5, before structuring. FIG. 6 shows an optical micrograph image of the structured fluoropolymer film with a biaxial strain of about 251.8%. FIG. 7 shows a micrograph image of the structured fluoropolymer film of FIG. 6.

TABLE 6

| Sample | Strain set point x-axis (%) | Strain set point y-axis (%) | MPA (g/m²) | Areal Strain (%) |
|---|---|---|---|---|
| 3 | 25 | 25 | 19.74 | 50.78 |
| 3 | 38 | 38 | 26.69 | 103.8 |
| 3 | 50 | 50 | 46.07 | 251.8 |
| 3 | 65 | 65 | 95.09 | 626.1 |

Example 7: Preparation of a Dense Fluoropolymer Film

A PTFE resin mixture was prepared and formed into a cylindrical pellet as described in Example 1. The pellet was then extruded through a rectangular die at a reduction ratio of 182:1 to form a tape having a thickness of 0.635 mm. The tape was then dried such that remaining lubricant was removed.

After drying, the tape was expanded in a longitudinal direction between heated drums at a temperature of 320° C. and a stretch ratio of about 3.3:1. The tape was then expanded in the transverse direction at a temperature of 320° C. and a stretch ratio of 9.3:1 to form an unsintered ePTFE membrane.

The membrane was then densified as described in Example 1. After compression, the membrane was loaded onto a pantograph machine. The material was then heated to a temperature of about 370° C. for a period of about 10 min. The heated membrane was then stretched at a strain rate of about 8% per second until a ratio of about 4.7:1 in the transverse direction was achieved. The matrix tensile strength (MTS) was measured in both the machine direction and transverse direction. Results are provided in Table 7.

TABLE 7

| Sample | MPA (g/m²) | Thickness (μm) | Longitudinal MTS (MPa) | Transverse MTS (MPa) | Void Volume | Methane Permeation (μm * μg/cm²/min) |
|---|---|---|---|---|---|---|
| 4 | 11.84 | 6 | 106.7 | 462.9 | 0.66% | 0.35 |

Example 8: Preparation of a Structured Fluoropolymer Film

The structured fluoropolymer films were formed from the dense fluoropolymer film of Example 7 according to the process described in Example 2. Results are shown in Table 8.

TABLE 8

| Sample | Strain set point x-axis (%) | Strain set point y-axis (%) | MPA (g/m²) | Areal Strain (%) |
|---|---|---|---|---|
| 4 | 10 | 10 | 15.92 | 34.44 |
| 4 | 15 | 15 | 16.44 | 38.89 |
| 4 | 20 | 20 | 16.54 | 39.71 |

Example 9: Preparation of a Dense Fluoropolymer Film

A PTFE resin was mixed with isoparaffinic hydrocarbon lubricant (ISOPAR® K, Exxon, Houston, TX) at a concentration of 0.201 g/g. The mixture was then blended and compressed into a cylindrical pellet. The pellet was thermally conditioned for a period of about 24 hours at a temperature of 49° C. The pellet was then extruded through a rectangular die at a reduction ratio of 182:1 to form a tape having a thickness of 0.635 mm. The tape was then dried such that remaining lubricant was removed.

After drying, the tape was expanded in a longitudinal direction (e.g., machine direction) at a temperature of 300° C. and a stretch ratio of about 11.5:1. The tape was then expanded in a transverse direction at a temperature of 300° C. and a stretch ratio of about 4:1 to form an unsintered ePTFE membrane.

The membrane was then densified as described in Example 1. After compression, the membrane was loaded onto a pantograph machine. The material was then heated to a temperature of about 370° C. for a period of about 10 min.

The heated membrane was then stretched at a strain rate of about 3% per second until a ratio of about 2.6:1 in the transverse direction was achieved. The matrix tensile strength (MTS) was measured in both the machine direction and transverse direction. Results are provided in Table 9.

TABLE 9

| Sample | MPA (g/m²) | Thickness (μm) | Longitudinal MTS (MPa) | Transverse MTS (MPa) | Void Volume | Methane Permeation (μm * μg/cm²/min) |
|---|---|---|---|---|---|---|
| 5 | 14.78 | 7 | 361.7 | 202.0 | 11.15% | 50 |

Example 10: Preparation of a Structured Fluoropolymer Film

Both a uniaxially-structured fluoropolymer film and a biaxially-structured fluoropolymer film were formed from the dense fluoropolymer film of Example 9 according to the process described in Example 2. Results are shown in Table 10.

TABLE 10

| Sample | Structure | Strain set point x-axis (%) | Strain set point y-axis (%) | MPA (g/m²) | Areal Strain (%) |
|---|---|---|---|---|---|
| 5 | Uniaxial | 10 | 0 | 15.98 | 8.13 |
| 5 | Uniaxial | 15 | 0 | 16.88 | 14.23 |
| 5 | Uniaxial | 20 | 0 | 18.03 | 21.98 |
| 5 | Biaxial | 10 | 10 | 18.06 | 22.16 |
| 5 | Biaxial | 15 | 15 | 19.82 | 34.07 |
| 5 | Biaxial | 20 | 20 | 22.24 | 50.50 |

Example 11: Preparation of a Densified Laminate

A PTFE resin was mixed with isoparaffinic hydrocarbon lubricant (ISOPAR® K, Exxon, Houston, TX) at a concentration of 0.184 g/g. The mixture was then blended and compressed into a cylindrical pellet. The pellet was thermally conditioned for a period of about 18 hours at a temperature of 49° C. The pellet was then extruded through a rectangular die at a reduction ratio of 78:1 to form a tape having a thickness of 0.559 mm. The tape was then calendered between two rolls at a temperature of 50° C. and a speed of about 4.57 m/min to achieve a thickness of 0.305 mm. The calendered tape was then dried.

After drying, the tape was expanded in a longitudinal direction (e.g., machine direction) between heated drums at a temperature of 300° C. and a stretch ratio of about 3:1. The tape was combined with an FEP film having a thickness of 0.076 mm (DowDuPont, Wilmington, DE) at a temperature of 300° C. The tape and film were then stretched at a rate of about 1.83 m/min at a stretch ratio of 1.8:1 to form an ePTFE/FEP laminate.

The laminate was then stretched in a transverse direction at a temperature of 300° C. and a strain rate of about 101% per second to a stretch ratio of about 7:1.

The laminate was then densified as described in Example 1. After compression, the laminate was loaded onto a pantograph machine. The material was then heated to a temperature of about 370° C. for a period of about 10 min. The heated membrane was then stretched at a strain rate of about 7.5% per second until a ratio of about 4.5:1 in the transverse direction was achieved. The matrix tensile strength (MTS) was measured in both the machine direction and transverse direction. Results are provided in Table 11.

TABLE 11

| Sample | MPA (g/m²) | Thickness (μm) | Longitudinal MTS (MPa) | Transverse MTS (MPa) | Void Volume | Methane Permeation (μm * μg/cm²/min) |
|---|---|---|---|---|---|---|
| 6 | 12.73 | 2.8 | 144.83 | 193.65 | 4.26% | 1.3 |

Example 12: Preparation of a Structured Laminate

A structured laminate was formed from the dense laminate of Example 11 according to the process described in Example 2. Results are shown in Table 12.

TABLE 12

| Sample | Strain set point x-axis (%) | Strain set point y-axis (%) | MPA (g/m²) | Areal Strain (%) |
|---|---|---|---|---|
| 6 | 10 | 10 | 14.36 | 12.82 |
| 6 | 15 | 15 | 17.22 | 35.27 |
| 6 | 66 | 66 | 92.73 | 628.4 |

Example 13: Preparation of a Dense Fluoropolymer Film

A perfluoro (ethyl vinyl ether)-tetrafluoroethylene (PEVE-TFE) copolymer resin was prepared according to the process outlined in U.S. Pat. No. 9,644,054 to Ford et al.

The PEVE-TFE copolymer resin was blended with PTFE in a ratio of 50:50. The mixture was then combined with an isoparaffinic lubricant (ISOPAR® K) at a concentration of 0.217 g/g. The mixture was compressed into a cylindrical pellet. The pellet was thermally conditioned for a period of about 18 hours at a temperature of 49° C. The pellet was then extruded through a rectangular die at a reduction ratio of 77:1 to form a tape having a thickness of 0.610 mm. The tape was then calendered between two rolls at a rate of 3.05 m/min until a thickness of 0.229 mm was achieved. The calendered tape was then dried.

After drying, the tape was stretched in a pantograph machine at a temperature of about 370° C. and a strain rate of about 100% per second until a ratio of about 3.9:1 in the longitudinal direction and 10:1 in the transverse direction was obtained. The matrix tensile strength (MTS) was measured in both the longitudinal direction and transverse direction. Results are provided in Table 13.

TABLE 13

| Sample | MPA (g/m²) | Thickness (μm) | Longitudinal MTS (MPa) | Transverse MTS (MPa) | Void Volume | Methane Permeation (μm * μg/cm²/min) |
|---|---|---|---|---|---|---|
| 7 | 15.4 | 7 | 170.44 | 217.85 | 0.04% | 0.45 |

Example 14: Preparation of a Structured Fluoropolymer Film

A structured fluoropolymer film was formed from the dense fluoropolymer film of Example 13 according to the process described in Example 2. Results are provided in Table 14.

TABLE 14

| Sample | Strain set point x-axis (%) | Strain set point y-axis (%) | MPA (g/m²) | Areal Strain (%) |
|---|---|---|---|---|
| 7 | 25 | 25 | 25.57 | 66.02 |
| 7 | 50 | 50 | 44.61 | 189.7 |
| 7 | 66 | 66 | 106.3 | 590.5 |

Example 15: Displacement Induction Period (DIP) of a Structured Fluoropolymer Film The structured fluoropolymer films of Examples 1-6 were subject to the ball burst test described herein and displacement induction period (DIP) was determined. Results are shown in Table 15.

TABLE 15

| Sample | Areal Strain (%) | DIP (in.) | DIP (cm) | DIP (sec) |
|---|---|---|---|---|
| 1 | 0 | 0.09 | 0.23 | 0.27 |
| 1 | 56.2 | 0.192 | 0.49 | 0.58 |
| 1 | 124.1 | 0.244 | 0.62 | 0.73 |
| 1 | 207.9 | 0.207 | 0.53 | 0.62 |
| 2 | 0 | 0.106 | 0.277 | 0.32 |
| 2 | 26.5 | 0.211 | 0.54 | 0.63 |
| 2 | 117.5 | 0.262 | 0.67 | 0.79 |
| 2 | 237.3 | 0.239 | 0.61 | 0.72 |
| 3 | 0 | 0.135 | 0.34 | 0.41 |
| 3 | 50.8 | 0.254 | 0.65 | 0.76 |
| 3 | 103.8 | 0.361 | 0.92 | 1.08 |
| 3 | 251.8 | 0.546 | 1.4 | 1.64 |

As shown, within a sample, as the areal strain of the structured fluoropolymer films increased, the displacement induction period also increased. Thus, for a given fluoropolymer film, the greater the mass per unit area of the structured fluoropolymer film, the greater the displacement induction period of the structured fluoropolymer film and, generally, the more strain the film can endure before degradation of the barrier properties.

Figure 8:
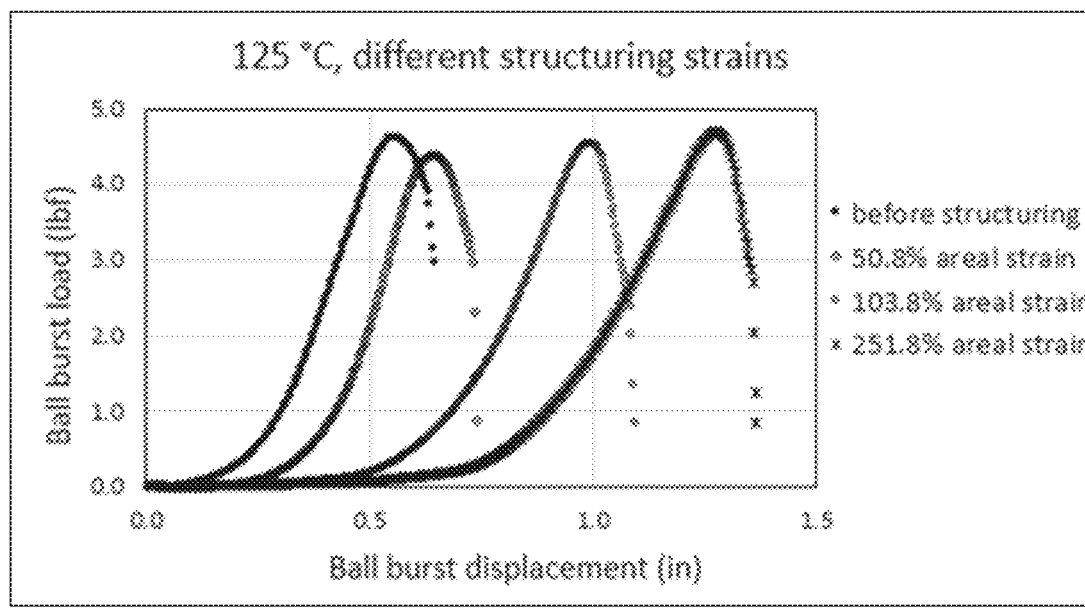
FIG. 8 is a graph showing displacement induction period of a structured fluoropolymer film, in accordance with an embodiment.

FIG. 8 shows a graph of the displacement induction period for Sample 3 at varying amounts of areal strain. The graph shows that structured fluoropolymer films with more areal strain show a larger ball burst displacement (e.g., a larger displacement induction period) at respective ball burst loads compared to unstructured fluoropolymer films and structured fluoropolymer films having less areal strain.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A method of making a structured fluoropolymer film, the method comprising:
   stretching an elastic substrate,
   applying a dense fluoropolymer film onto the stretched elastic substrate such that the dense fluoropolymer film reversibly adheres to the elastic substrate; and
   relaxing the elastic substrate with the dense fluoropolymer film thereon to obtain a structured fluoropolymer film, the structured fluoropolymer film including a plurality of structures having a height at least two times a thickness of the dense fluoropolymer film from the applying step.

2. The method of claim 1, further comprising: adhering the structured fluoropolymer film to a surface of a material selected from the group consisting of: a composite and a laminate.

3. The method of claim 1, wherein the structured fluoropolymer film has a matrix tensile strength in at least one direction that is greater than or equal to about 7.0 MPa.

4. The method of claim 1, wherein the structured fluoropolymer film comprises PTFE.

5. The method of claim 1, wherein the dense fluoropolymer film comprises a fluoropolymer selected from the group consisting of: polytetrafluoroethylene (PTFE), a modified PTFE, TFE copolymers and combinations thereof.

6. The method of claim 1, wherein the dense fluoropolymer film has a thickness of from 0.5 μm to 250 μm.

7. The method of claim 1, wherein the elastic substrate comprises a material selected from the group consisting of: polysiloxane, fluorosilicone rubber and combinations thereof.

8. The method of claim 1, wherein the elastic substrate is stretched at a processing ratio of from 1.1 to 11 in at least one direction.

9. The method of claim 1, wherein forming the dense fluoropolymer film comprises:
   providing a biaxially expanded PTFE film;
   densifying the biaxially expanded PTFE film to form a densified PTFE film; and stretching the densified PTFE film at a temperature greater than the crystalline melt temperature of PTFE to form a dense fluoropolymer film.

10. The method of claim 9, wherein the dense fluoropolymer film has a water vapor permeability coefficient of about 0.015 g*mm/m$^2$/day.

11. The method of claim 9, wherein the biaxially expanded PTFE film is sintered prior to densifying the expanded PTFE film.

* * * * *